United States Patent
Massand

(10) Patent No.: US 10,685,177 B2
(45) Date of Patent: Jun. 16, 2020

(54) SYSTEM AND METHOD FOR COMPARING DIGITAL DATA IN SPREADSHEETS OR DATABASE TABLES

(75) Inventor: Deepak Massand, McLeansville, NC (US)

(73) Assignee: LITERA CORPORATION, Chicago, IL (US)

(*) Notice: Subject to any disclaimer, the term of this patent is extended or adjusted under 35 U.S.C. 154(b) by 509 days.

(21) Appl. No.: 12/350,144

(22) Filed: Jan. 7, 2009

(65) Prior Publication Data

US 2010/0174678 A1    Jul. 8, 2010

(51) Int. Cl.
| | |
|---|---|
| *G06F 40/197* | (2020.01) |
| *G06F 16/23* | (2019.01) |
| *G06F 40/18* | (2020.01) |
| *G06F 40/194* | (2020.01) |

(52) U.S. Cl.
CPC ........ *G06F 40/197* (2020.01); *G06F 16/2358* (2019.01); *G06F 40/18* (2020.01); *G06F 40/194* (2020.01)

(58) Field of Classification Search
CPC .. G06F 17/246; G06F 17/2211; G06F 40/197; G06F 40/194; G06F 40/18; G06F 16/2358
USPC ............... 707/610, 692, 694, 695, 770, 737; 717/152, 105
See application file for complete search history.

(56) References Cited

U.S. PATENT DOCUMENTS

| | | | |
|---|---|---|---|
| 3,920,895 A | 11/1975 | Vieri et al. | |
| 3,920,896 A | 11/1975 | Bishop et al. | |
| 5,008,853 A | 4/1991 | Bly et al. | |
| 5,129,082 A | 7/1992 | Tirfing et al. | |
| 5,146,552 A | 9/1992 | Cassoria et al. | |
| 5,204,947 A | 4/1993 | Bernstein et al. | |
| 5,272,628 A | 12/1993 | Koss | |
| 5,321,505 A | 6/1994 | Leddy | |
| 5,341,469 A | 8/1994 | Rossberg et al. | |
| 5,499,180 A * | 3/1996 | Ammirato | G06F 3/0489 715/204 |
| 5,515,491 A | 5/1996 | Bates et al. | |
| 5,539,871 A | 7/1996 | Gibson | |
| 5,596,700 A | 1/1997 | Darnell et al. | |
| 5,596,705 A | 1/1997 | Reimer et al. | |
| 5,606,609 A | 2/1997 | Houser et al. | |
| 5,659,676 A | 8/1997 | Redpath | |
| 5,664,208 A | 9/1997 | Pavley et al. | |
| 5,669,005 A | 9/1997 | Curbow et al. | |
| 5,671,428 A | 9/1997 | Muranaga et al. | |
| 5,694,544 A | 12/1997 | Tanigawa et al. | |
| 5,706,452 A | 1/1998 | Ivanov | |
| 5,706,502 A | 1/1998 | Floey et al. | |

(Continued)

OTHER PUBLICATIONS

Formula Software, Excel Compare, Oct. 3, 2008, pp. 1-2.*

(Continued)

*Primary Examiner* — David T. Brooks

(74) *Attorney, Agent, or Firm* — Nixon Peabody LLP

(57) ABSTRACT

A system, method and computer program product compares data in original and modified versions of spreadsheet or database table documents, and generates a comparison document having indications where changes between the documents are present. The data compared includes formulas or stored procedures that are normally hidden when viewing a spreadsheet or database table document.

10 Claims, 11 Drawing Sheets

(56) References Cited

U.S. PATENT DOCUMENTS

| | | | |
|---|---|---|---|
| 5,708,826 A | 1/1998 | Ikeda et al. | |
| 5,708,845 A | 1/1998 | Wistendahi et al. | |
| 5,740,444 A | 4/1998 | Frid-Nielsen | |
| 5,752,055 A | 5/1998 | Redpath et al. | |
| 5,758,313 A | 5/1998 | Shah et al. | |
| 5,761,419 A | 6/1998 | Schwartz et al. | |
| 5,761,499 A | 6/1998 | Sonderegger | |
| 5,781,732 A | 7/1998 | Adams | |
| 5,781,901 A | 7/1998 | Kuzma | |
| 5,787,175 A | 7/1998 | Carter | |
| 5,799,191 A | 8/1998 | Moriyasu et al. | |
| 5,801,702 A | 9/1998 | Dolan et al. | |
| 5,806,078 A * | 9/1998 | Hug et al. | 715/205 |
| 5,809,512 A | 9/1998 | Kato | |
| 5,860,073 A | 1/1999 | Ferrel et al. | |
| 5,864,870 A | 1/1999 | Guck | |
| 5,870,754 A | 2/1999 | Dimitrova et al. | |
| 5,878,421 A | 3/1999 | Ferrel et al. | |
| 5,890,177 A | 3/1999 | Moody et al. | |
| 5,893,126 A | 4/1999 | Drew et al. | |
| 5,911,776 A | 6/1999 | Guck | |
| 5,931,906 A | 8/1999 | Fidelibus, Jr. et al. | |
| 5,937,066 A | 8/1999 | Gennaro et al. | |
| 5,938,724 A | 8/1999 | Pommier et al. | |
| 5,941,944 A | 8/1999 | Messerly | |
| 5,944,785 A | 8/1999 | Pommier et al. | |
| 5,949,413 A | 9/1999 | Lerissa et al. | |
| 5,950,214 A | 9/1999 | Rivette et al. | |
| 5,956,736 A | 9/1999 | Hanson et al. | |
| 5,958,006 A | 9/1999 | Eggleston et al. | |
| 5,978,836 A | 11/1999 | Ouchi | |
| 5,987,469 A | 11/1999 | Lewis et al. | |
| 6,009,462 A | 12/1999 | Birrell et al. | |
| 6,014,135 A | 1/2000 | Fernandes | |
| 6,029,171 A | 2/2000 | Smiga et al. | |
| 6,061,696 A | 5/2000 | Lee et al. | |
| 6,064,751 A | 5/2000 | Smithies et al. | |
| 6,067,551 A | 5/2000 | Brown et al. | |
| 6,088,709 A | 6/2000 | Watanabe | |
| 6,119,147 A | 9/2000 | Tommey et al. | |
| 6,158,903 A | 12/2000 | Schaeffer et al. | |
| 6,178,431 B1 | 1/2001 | Douglas | |
| 6,182,080 B1 | 1/2001 | Clements | |
| 6,212,534 B1 | 4/2001 | Lo et al. | |
| 6,243,722 B1 | 5/2001 | Day et al. | |
| 6,289,460 B1 | 9/2001 | Hajmiragha | |
| 6,317,777 B1 | 11/2001 | Skarbo et al. | |
| 6,324,555 B1 | 11/2001 | Sites | |
| 6,334,141 B1 | 12/2001 | Varma et al. | |
| 6,336,134 B1 | 1/2002 | Varma | |
| 6,343,313 B1 | 1/2002 | Salesky et al. | |
| 6,360,236 B1 | 3/2002 | Khan et al. | |
| 6,363,352 B1 | 3/2002 | Dailey et al. | |
| 6,411,989 B1 | 6/2002 | Anupam et al. | |
| 6,507,858 B1 | 1/2003 | Kanerva et al. | |
| 6,560,620 B1 * | 5/2003 | Ching | 715/229 |
| 6,560,637 B1 | 5/2003 | Dunlap et al. | |
| 6,590,584 B1 | 7/2003 | Yamaura et al. | |
| 6,643,663 B1 | 11/2003 | Dabney et al. | |
| 6,658,626 B1 * | 12/2003 | Aiken | 715/205 |
| 6,681,371 B1 | 1/2004 | Devanbu | |
| 6,687,878 B1 | 2/2004 | Eintracht et al. | |
| 6,708,172 B1 | 3/2004 | Wong et al. | |
| 7,146,561 B2 | 12/2006 | Bauchot et al. | |
| 7,251,680 B2 | 6/2007 | DeVos | |
| 7,260,773 B2 | 8/2007 | Zernik | |
| 7,266,554 B2 | 9/2007 | Kayahara et al. | |
| 7,496,841 B2 * | 2/2009 | Hadfield et al. | 715/255 |
| 7,650,355 B1 * | 1/2010 | Davis | 715/234 |
| 7,987,444 B2 * | 7/2011 | Fuller et al. | 717/105 |
| 8,315,997 B1 * | 11/2012 | Peled et al. | 707/695 |
| 2001/0037367 A1 | 11/2001 | Iyer | |
| 2002/0023106 A1 * | 2/2002 | Bauchot | G06F 17/246 |
| | | | 715/212 |
| 2002/0049786 A1 | 4/2002 | Bibliowicz et al. | |
| 2002/0059342 A1 | 5/2002 | Gupta et al. | |
| 2002/0059343 A1 | 5/2002 | Kurishima et al. | |
| 2002/0065848 A1 | 5/2002 | Walker et al. | |
| 2002/0078088 A1 | 6/2002 | Kuruoglu et al. | |
| 2002/0085030 A1 | 7/2002 | Ghani | |
| 2002/0107886 A1 | 8/2002 | Gentner et al. | |
| 2002/0143691 A1 | 10/2002 | Ramaley et al. | |
| 2003/0023961 A1 * | 1/2003 | Barsness et al. | 717/152 |
| 2003/0112273 A1 | 6/2003 | Hadfield et al. | |
| 2003/0158855 A1 | 8/2003 | Farnham et al. | |
| 2003/0197730 A1 | 10/2003 | Kakuta et al. | |
| 2003/0217336 A1 | 11/2003 | Gounares et al. | |
| 2004/0085354 A1 * | 5/2004 | Massand | 345/751 |
| 2004/0153469 A1 * | 8/2004 | Keith-Hill | 707/101 |
| 2004/0205653 A1 | 10/2004 | Hadfield et al. | |
| 2004/0230616 A1 * | 11/2004 | Kruy et al. | 707/104.1 |
| 2005/0010863 A1 * | 1/2005 | Zernik | 715/511 |
| 2005/0015716 A1 * | 1/2005 | Lavoie et al. | 715/511 |
| 2005/0097464 A1 * | 5/2005 | Graeber | 715/700 |
| 2005/0108280 A1 | 5/2005 | Kagle et al. | |
| 2006/0167879 A1 | 7/2006 | Umeki et al. | |
| 2006/0253482 A1 | 11/2006 | Zellweger et al. | |
| 2006/0259524 A1 * | 11/2006 | Horton | 707/201 |
| 2006/0262339 A1 | 11/2006 | Jacobs et al. | |
| 2007/0011183 A1 | 1/2007 | Langseth et al. | |
| 2007/0011211 A1 * | 1/2007 | Reeves et al. | 707/203 |
| 2007/0186157 A1 | 8/2007 | Walker et al. | |
| 2007/0294610 A1 | 12/2007 | Ching | |
| 2008/0104016 A1 * | 5/2008 | Atmaja | G06F 17/2211 |
| 2008/0178117 A1 * | 7/2008 | Gelman et al. | 715/808 |
| 2008/0222508 A1 * | 9/2008 | Nguyen et al. | 715/212 |
| 2008/0256188 A1 | 10/2008 | Massand | |
| 2008/0275870 A1 | 11/2008 | Shanahan et al. | |
| 2008/0301193 A1 | 12/2008 | Massand | |
| 2009/0119578 A1 | 5/2009 | Relyea et al. | |
| 2009/0157679 A1 * | 6/2009 | Elias et al. | 707/6 |
| 2009/0271401 A1 * | 10/2009 | Powell et al. | 707/5 |
| 2009/0276692 A1 | 11/2009 | Rosner | |
| 2010/0049745 A1 * | 2/2010 | Aebig et al. | 707/200 |
| 2014/0033101 A1 * | 1/2014 | Rein | G06F 17/30575 |
| | | | 715/771 |

OTHER PUBLICATIONS

NPL—DiffEngineX "A Better Way to View Character Level Differences" Published Nov. 10, 2008 & "Powerful DiffEngineX Options" Published Nov. 7, 2007.*

OZGrid, 'Compare Excel Workbooks with Compare Excel Workbooks', archive.org version published on Jan. 22, 2007 at www.ozgrid.com/Services/excel-compare-add-in.htm (Year: 2007).*

OZGrid, 'Excel: Compare Two Excel Ranges', archive.org version published Jan. 28, 2007 at www.ozgrid.com:80/Excel/compare-excel-ranges.htm (Year: 2007).*

FormulaSoftware, 'Welcome Page', archive.org version published Sep. 13, 2008 at www.formulasoft.com/index.html (Year: 2008).*

FormulaSoftware, 'Excel Compare Screenshot Image', archive.org version published Nov. 18, 2007 at www.formulasoft.com/img/xlscmain.gif (Year:2007).*

U.S. Appl. No. 12/413,486, filed Mar. 27, 2009.

U.S. Appl. No. 12/406,093, filed Mar. 17, 2009.

Office Action issued in Co-Pending U.S. Appl. No. 12/406,093, dated Mar. 29, 2011.

U.S. Appl. No. 11/699,750, filed Jan. 29, 2007.

Valade, Janet; PHP & MySQL: Your visual blueprint for creating dynamic, database-driven Web sites; 2006; Wiley; p. 63 (1 page).

Hey, Scripting Guy! Blog: How Can I build an Array from a Column of Data in Excel?; Oct. 12, 2005; pp. 1-2 (two pages).

Office Action dated Sep. 15, 2011, in Co-Pending U.S. Appl. No. 12/406,093, filed Mar. 17, 2009 (12 pages).

Office Action dated Apr. 3, 2012, in U.S. Appl. No. 12/861,000.

Office Action dated May 9, 2012, in U.S. Appl. No. 13/400,848.

Office Action dated Jun. 12, 2012, in U.S. Appl. No. 12/861,000.

* cited by examiner

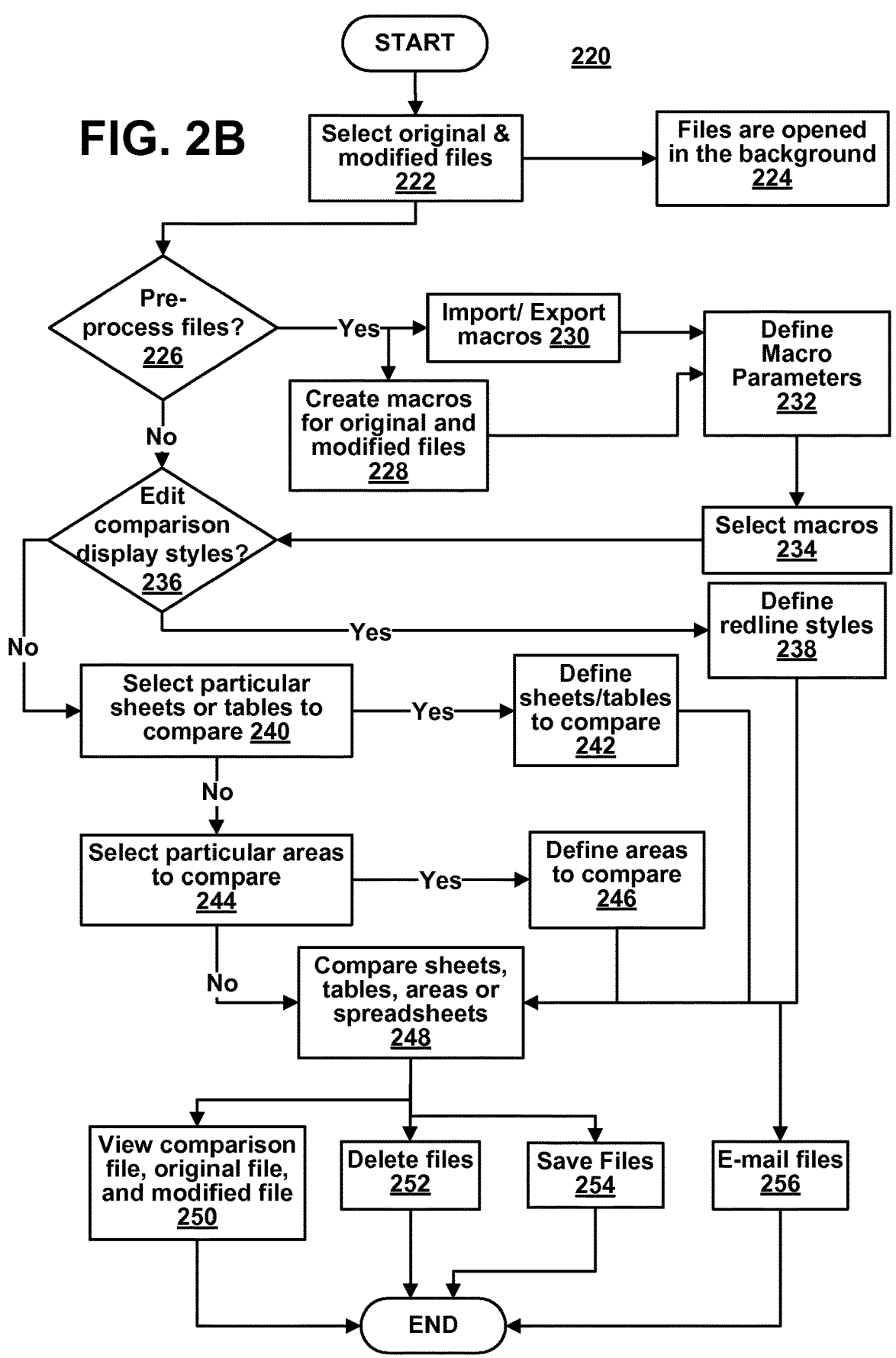

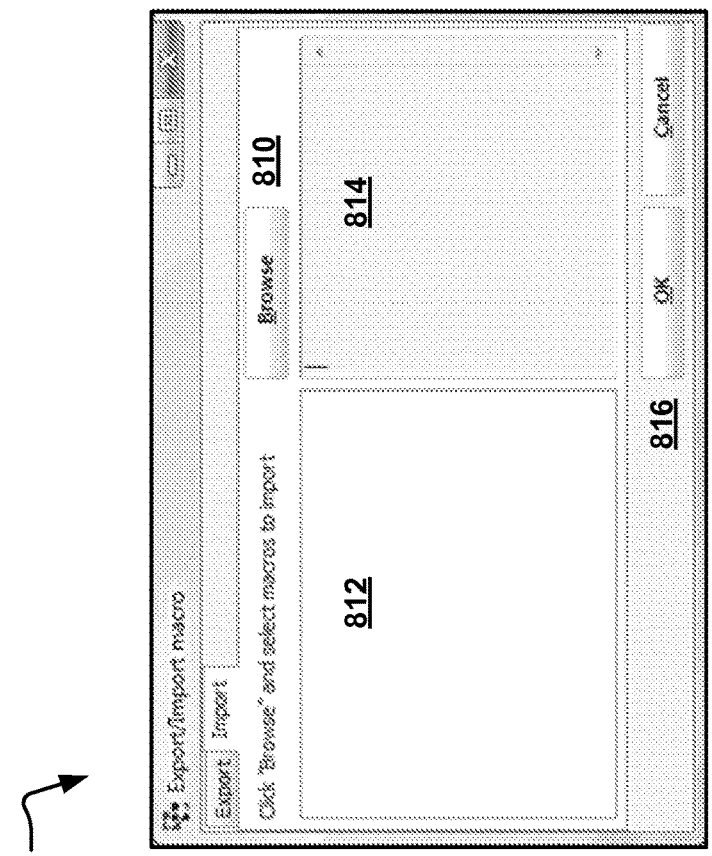
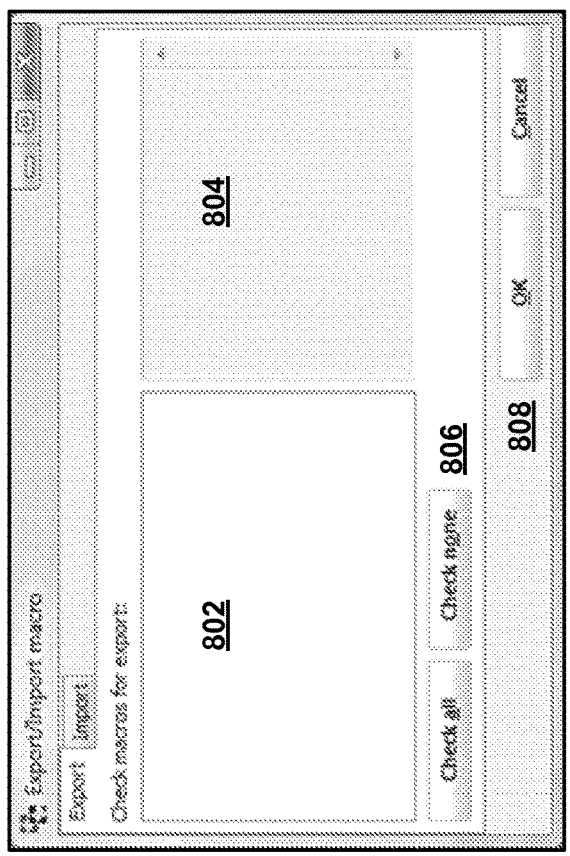
FIG. 8B
FIG. 8A

SYSTEM AND METHOD FOR COMPARING DIGITAL DATA IN SPREADSHEETS OR DATABASE TABLES

FIELD OF THE INVENTION

A system, method and computer program product for comparing digital data in spreadsheet or database tables are disclosed.

BACKGROUND

Spreadsheet programs, such as Microsoft Excel, Sun StarOffice Calc, Microsoft Works Spreadsheet and Apple Numbers, are computer applications that simulate paper worksheets by displaying multiple cells in rows and columns that contain text or numeric values. Many of these cells include formulas based on information in those cells and/or a combination of other cells within that spreadsheet or in a separate spreadsheet within a larger workbook document that determine what is presented in the contents of those particular cells. A change to a single cell can affect data presentation through an entire spreadsheet.

Database tables, such as those used in Microsoft Access, SQL Server, IBM DB, Oracle, Adobe ColdFusion and other databases, similarly present multiple cells in rows and columns that contain text or numeric values. Information included within these cells may contain formulas based on information in those and/or other combinations of cells within that database table or in a separate, linked database table that determine the presentation of content in the individual cells. Just as changes made to a single cell in a spreadsheet may affect global spreadsheet data, changes made to individual database table cells may affect the presentation of data throughout the table and multiple linked tables, as they often occur in database or spreadsheet programs.

The use of spreadsheets and database tables, in their earliest incarnations in the 1980s and early 1990s, were simple tools used at an individual level to manage the presentation and comprehension of data and information. However, with increases in technology and collaborative capacity and the complexity of data management, the nature of the data processing has changed. Currently, spreadsheet and database table data are accessed by multiple users that create series of revisions and multiple documents. In addition, users manage complex data relationships within individual spreadsheets or database tables or across linked spreadsheets or database tables.

SUMMARY

Embodiments of the invention provide a capacity to compare cell values and formulas and stored procedures in spreadsheets and database tables by comparing data presented in an original spreadsheet or database table and data in a modification of that original spreadsheet or database table.

Aspects of the invention include processes associated with a method, system or computer program product that produce a comparison document showing changes between spreadsheet or database table data in documents. These processes include receiving information identifying first and second spreadsheet or database table documents, comparing values of cells of the first document with values of corresponding cells of the second document, detecting whether formulas or stored procedures exist within the first and second documents, and comparing any detected formulas or stored procedures of the first document with those of the second document. A comparison document is generated after comparing the cell values and any formulas and stored procedures. The comparison document includes indications of any changes between the compared cells, and any detected formulas or stored procedures of the first and second documents.

Still other aspects and features of the invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

Embodiments of the invention are illustrated by way of example, and not by way of limitation, in the figures of the accompanying drawings, which are included to provide a further understanding of the invention and are incorporated in and constitute a part of this specification. In the drawings:

FIG. 2B is a process flowchart of an exemplary process in accordance with another exemplary embodiment of the invention.

FIG. 3 shows a screenshot of an exemplary user interface for presenting retrieved comparison data in accordance with an exemplary embodiment of the invention.;

FIG. 4 shows a screenshot of an exemplary user interface that presents retrieved comparison data including formulas derived from connected spreadsheets and/or database tables in accordance with an exemplary embodiment of the invention.

FIGS. 8A and 8B show screenshots of exemplary user interfaces for exporting or importing macros in accordance with an exemplary embodiment of the invention.

DETAILED DESCRIPTION

Figure 1:
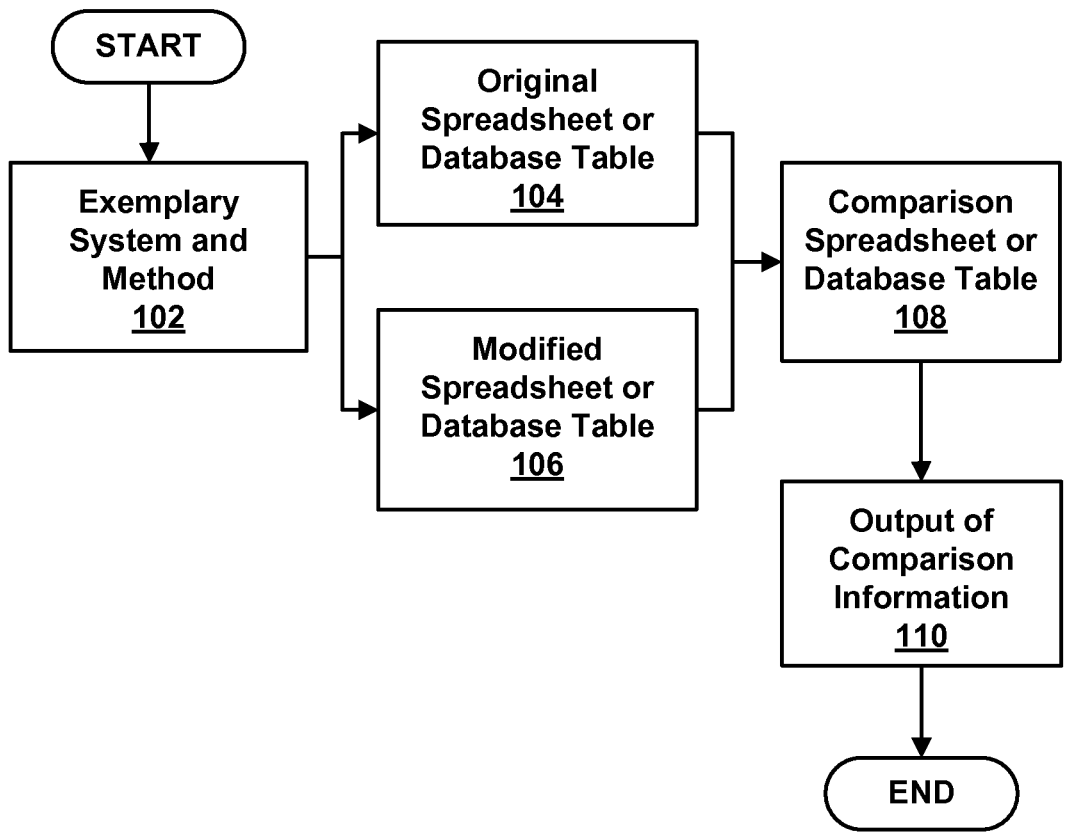
FIG. 1 is a block diagram of an exemplary system to retrieve data from multiple documents and compare data within those documents to create a comparison document.

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

Many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions, such as program modules, being executed by one or more processors, or by a combination of both. Moreover, the invention can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium would include the following: an electrical connection having one or more wires, magnetic disk storage, magnetic cassettes, magnetic tape or other magnetic storage devices, a portable computer diskette, a random access memory (RAM), a Read-Only Memory (ROM), an erasable programmable read-only memory (EPROM), Electrically Erasable Programmable Read-Only Memory (EEPROM or Flash memory) or any other medium capable of storing information. Thus, the various aspects of the invention may be embodied in many different forms, and all such forms are contemplated to be within the scope of the invention.

The invention includes recognition that conventional systems compare cell values in spreadsheets and database tables and provide only a highlighted cell or a simple overview of changes made in subsequent revisions of these documents. However, these comparison programs fail to discover formulas and stored procedures based on information in those cells and/or a combination of other cells that define what is presented in the content of those particular cells. For example, formulas included in Microsoft Excel are utilized to enable users to conduct complex mathematical processes involving multiple cells within the same spreadsheet or linked from multiple spreadsheets. Accordingly, while conventional systems compare results of mathematical formulas, these systems do not capture changes made at the formula or stored procedure levels. Furthermore, they do not compare cell value data in multiple spreadsheets. Exemplary embodiments described herein utilize a change management engine to investigate and compare cell value data, formulas and stored procedures in spreadsheet or database table cells. In some embodiments, a system and method provides a multitude of data parsing and presentation options, then presents the entirety of the spreadsheets and database tables' change history in a comparison document that provides detailed and defined information of changes made to cell values, formulas and processes within spreadsheet or database table cells.

Reference is now made to the drawings, and more particularly to FIG. 1, which illustrates an exemplary system and method 102 in accordance with exemplary embodiments for comparing cell values, and the formulas and processes in spreadsheets and database tables that may affect those cell values. In FIG. 1, the exemplary system and method 102 compares an original (or first) spreadsheet or database table document 104 and a modification of that original (or second) spreadsheet or database table document 106 and creates a comparison spreadsheet or database table 108. The exemplary system and method then provides output of the comparison information at 110, which may include changes to formulas and stored procedures between the original and modified spreadsheet or database table documents.

Figure 2A:
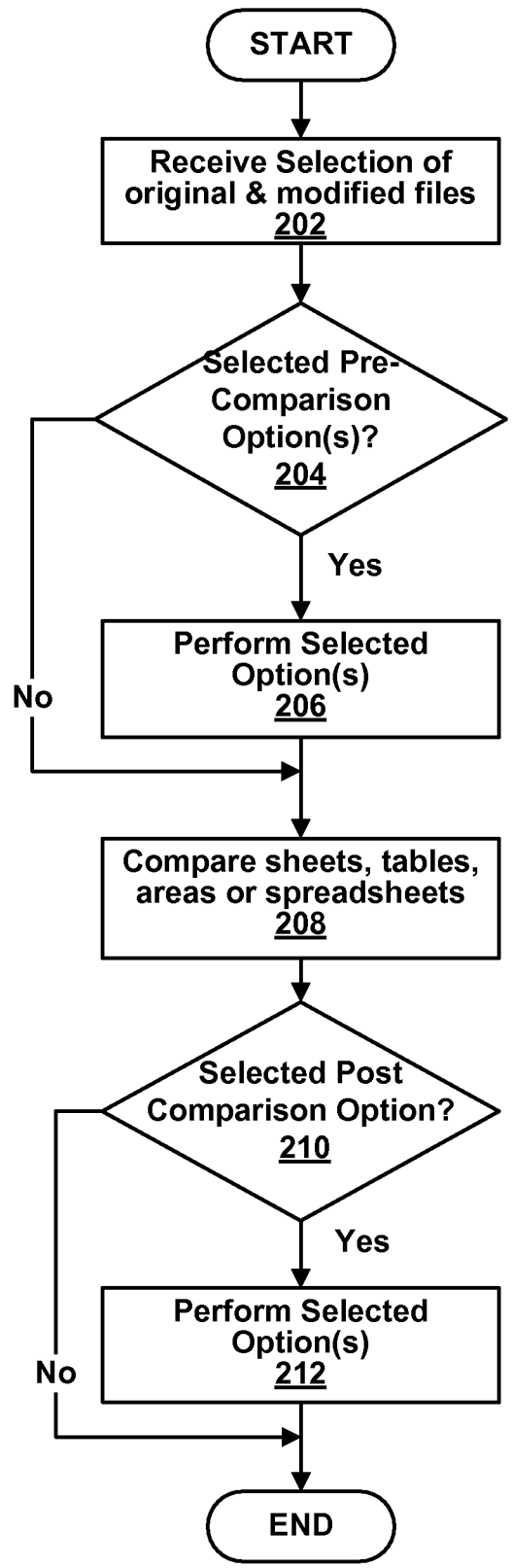
FIG. 2A is a process flowchart of an exemplary process for retrieving and comparing data from multiple spreadsheets and database tables in accordance with an exemplary embodiment of the invention.

Referring now to FIG. 2A, an exemplary process flow 200 according to some embodiments includes a process 202 of receiving selection of an original and modified document files. Next, a user is given an option at decision 204 of choosing to process the one or both of the documents prior to comparing them. If this option is chosen, selected pre-processing options are carried out at 206 before proceeding to process 208, where the original and modified documents are compared. If no preprocessing options are selected, the process 208 is performed with performing process 206. In decision 210, a user may choose from among multiple output options for the final comparison spreadsheet or database table. For example, output options may include viewing, saving, printing, or emailing the comparison file. If a particular output option is chosen, it may be performed in process 212 and the process flow 200 ends. If there no post comparison options are selected at decision 210, the process flow 200 may end after the comparison process 208. Alternatively, a default or predetermined or customized output may be performed before ending the process flow 200.

FIG. 2B illustrates a more detailed exemplary process 220 according to some embodiments that compares externally presented data, formulas and processes in spreadsheets or database tables that affect those externally presented data. In FIG. 2B, the process 220 is started and proceeds to process 222, where the user selects an original spreadsheet or database table and a modified version of that original spreadsheet or database table. The selected files open in the background of the exemplary application in process 224.

In some embodiments, a user would be provided with a series of options prior to conducting file comparisons. In one option, depicted in FIG. 2B as process 240, a user may be provided with a choice of particular sheets within a larger workbook or particular tables within a larger table database for comparison. Spreadsheets and/or tables are then defined in process 242 and compared in process 248.

Another option in some embodiments involves providing a user the ability to select for comparison specified areas within single or multiple spreadsheets or single or multiple tables in process 244. Areas to compare may then be defined in process 246.

Some embodiments may provide a user with the option of pre-processing spreadsheets or tables selected in process 226, prior to comparing these spreadsheets or tables. These pre-processing options may include any of: (1) process 228: creating macros for original and modified files; (2) process 230: importing or exporting macros; and (3) process 232: defining the parameters of created, imported and/or selected macros. Macros are then selected in process 234, for example, to define the process by which cell values and underlying formulas and stored procedures within spreadsheets or database tables are compared.

An additional option, after the selection of sheets/tables or areas to compare and the management of macros, process 236, allows the user to edit the comparison display styles. Users who select this editing capacity, in process 238, are provided with the ability to define redline styles, which define the way additions, deletions and other changes are displayed by the exemplary system and method. These may include multiple aspects of comparison display, such as defining the display of such file aspects as changes to formulas, the addition or deletion of rows or columns, and the editing of cell data.

The method 220 compares the original and modified spreadsheets or tables in process 248. This comparison may be performed after completing the any number of selected options, although it is not necessary for a user to select any pre-comparison option. For example, if no pre-comparison options are selected, exemplary methods may simply default to comparing the entire spreadsheets/tables after selection is made of the two documents for comparison. Additionally, other options not shown or described herein but apparent to those skilled in the art may be presented before performing a comparing process.

This comparison may be performed utilizing one of any number of algorithms that will be well understood to anyone familiar with the art. Some of these algorithms are used for solving Longest Common Sequence (LCS), Shortest Edit Script (SES) problems. For example, these algorithms may be the O(NP) Sequence Comparison Algorithm, the O(ND) Sequence Difference Algorithm, the Hunt-Szymanski LCS algorithm or an algorithm written by anyone familiar with the art of comparing tables.

Users may be presented with one or more post-processing options to be performed after completing the comparison process 248. In the exemplary method 220 shown in FIG. 2B, post processing options may include the process 250 of viewing the comparison, redline and original spreadsheets or tables, the process 252 of deleting the comparison spreadsheet or table, the process 254 of saving the comparison, redline and original spreadsheets or tables (or some combination therein), the process 256 of emailing the comparison spreadsheet or table. The post-processing options may be selected before, after or during the comparison process 248. In some embodiments, one or more post processing options may be preset by the user during a configuration process.

FIGS. 3 to 9E are screenshot representations of exemplary user interfaces and are representative of any of several program user interfaces for comparing two spreadsheet or database table documents.

Figure 3:
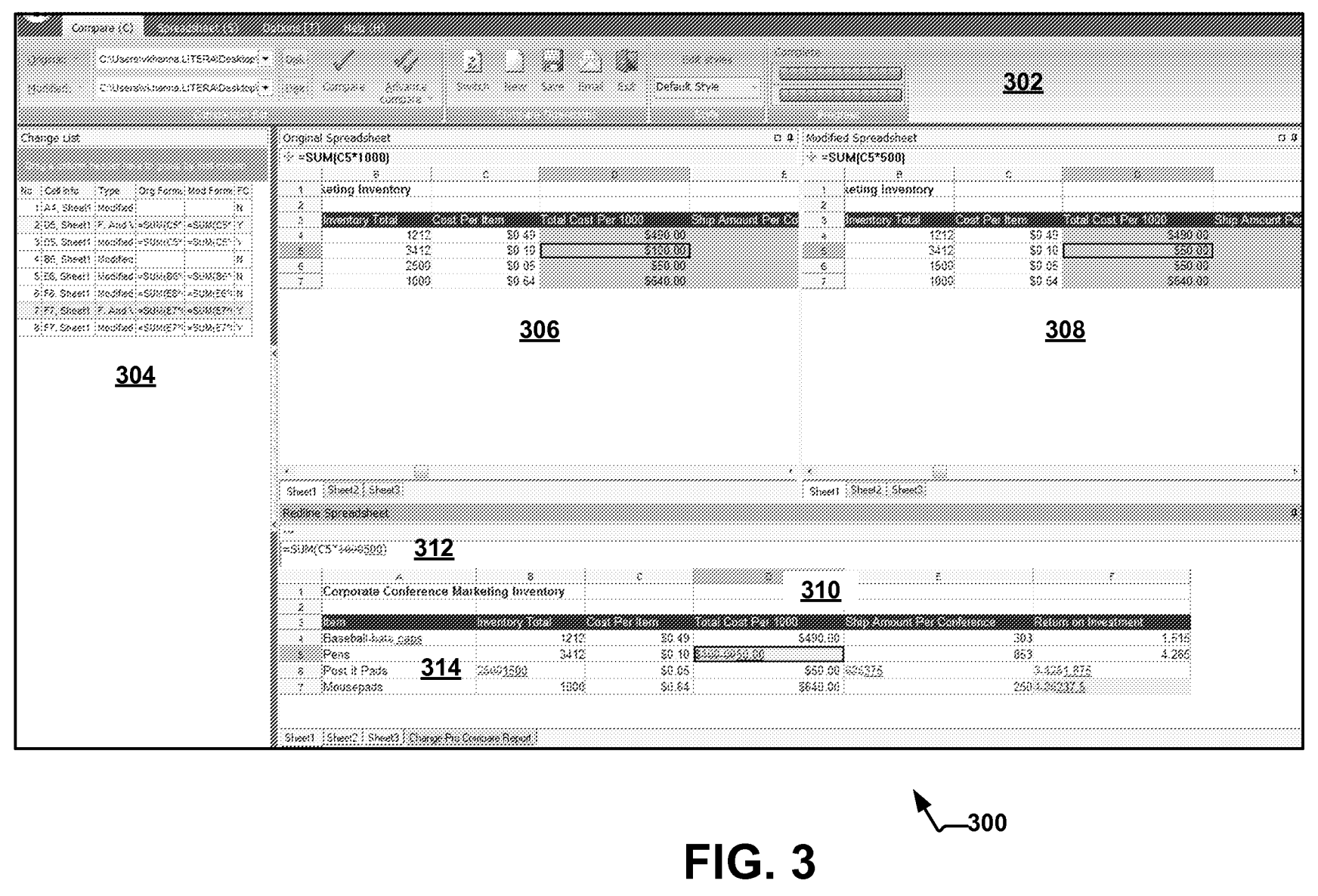

FIG. 3 is a screenshot of an exemplary graphical user interface 300 for presenting retrieved comparison data. The user interface 300 can display a presentation of an original spreadsheet or database table at 306, a presentation of a modification of that spreadsheet or database table at 308, and a presentation of a redline version of the spreadsheet or database table at 310.

The redline version of the spreadsheet or database table at 310 of the user interface 300 may include a display of a change management panel that enables line-item management of all changes presented in the comparison spreadsheet or database table. In 312, a formula change is displayed in the comparison file. In 314, a textual change in the modified version is displayed in the comparison file.

Referring again to FIG. 3, the user interface 300 also includes a tools and status user interface displayed in an area 302. Within this interface, the user may select documents to compare, start a comparison, define parameters of a comparison, set styles for the display of redlined files, view the status of a comparison, save and email files, or perform another task or function. The lists of changes may be displayed in an area 304, and which can be an interface that a user can view and sort changes or perform other functions. For example, in addition to viewing or sorting changes, a user may click on an entry in this interface to immediately view that change entry in the original, modified and redlined files.

Figure 4:
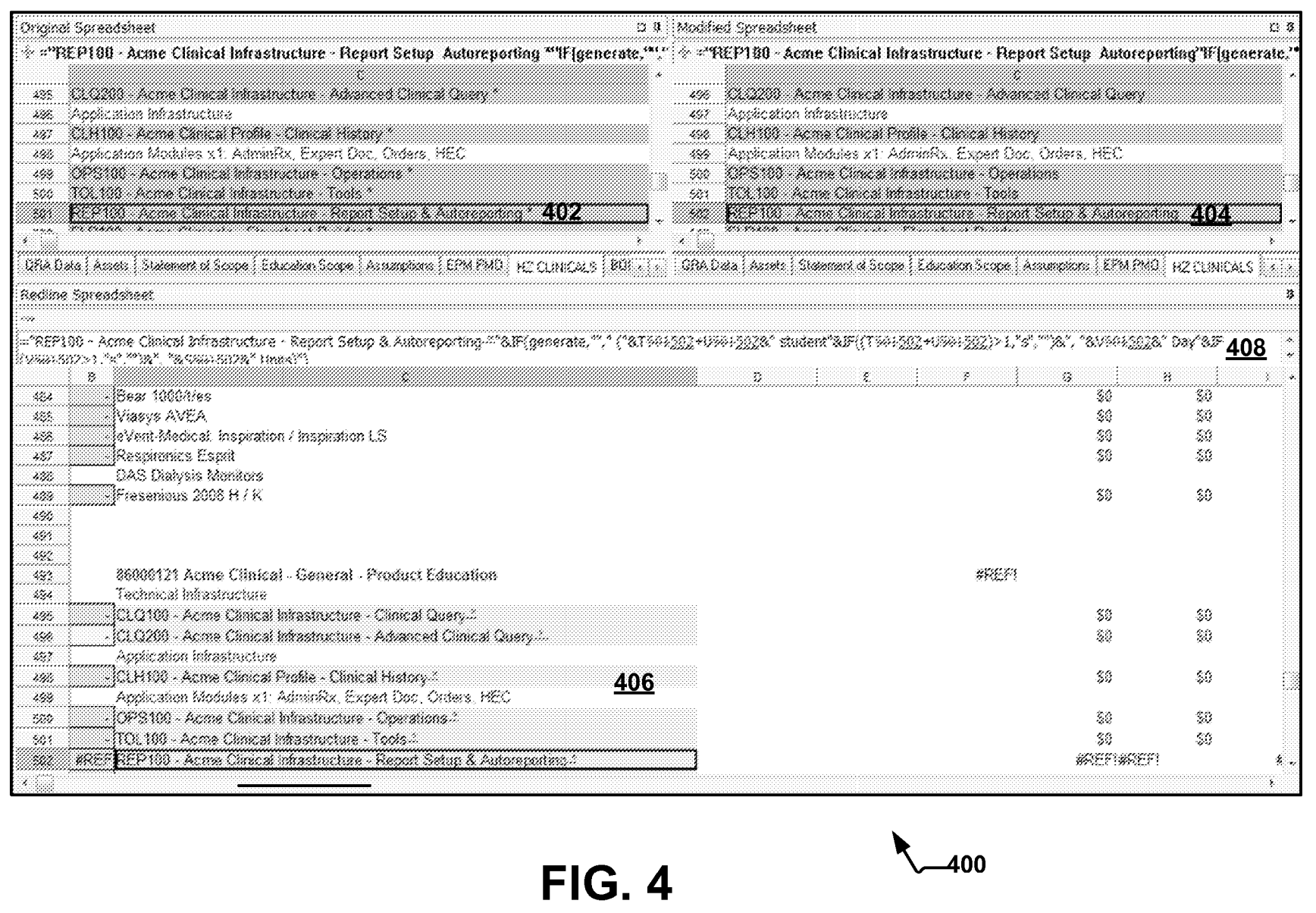

FIG. 4 is a screenshot of an exemplary graphical user interface 400 for presenting retrieved comparison data, for example, complex data including formulas derived from multiple and connected spreadsheets and/or database tables. In section 402, an original formula and data presentation of that formula are displayed in the original spreadsheet and/or database table screen. In section 404, the modified formula and data presentation of that modified formula is displayed in the modified spreadsheet and/or database table screen. In section 406, the redlined display of the formula/data presentation change is displayed in the redlined spreadsheet and/or database table screen. Area 408 displays a detailed presentation of the formula change, in which may comprise details of the changes made across separate sheets and/or tables within a larger worksheet or database table set.

Figure 5:
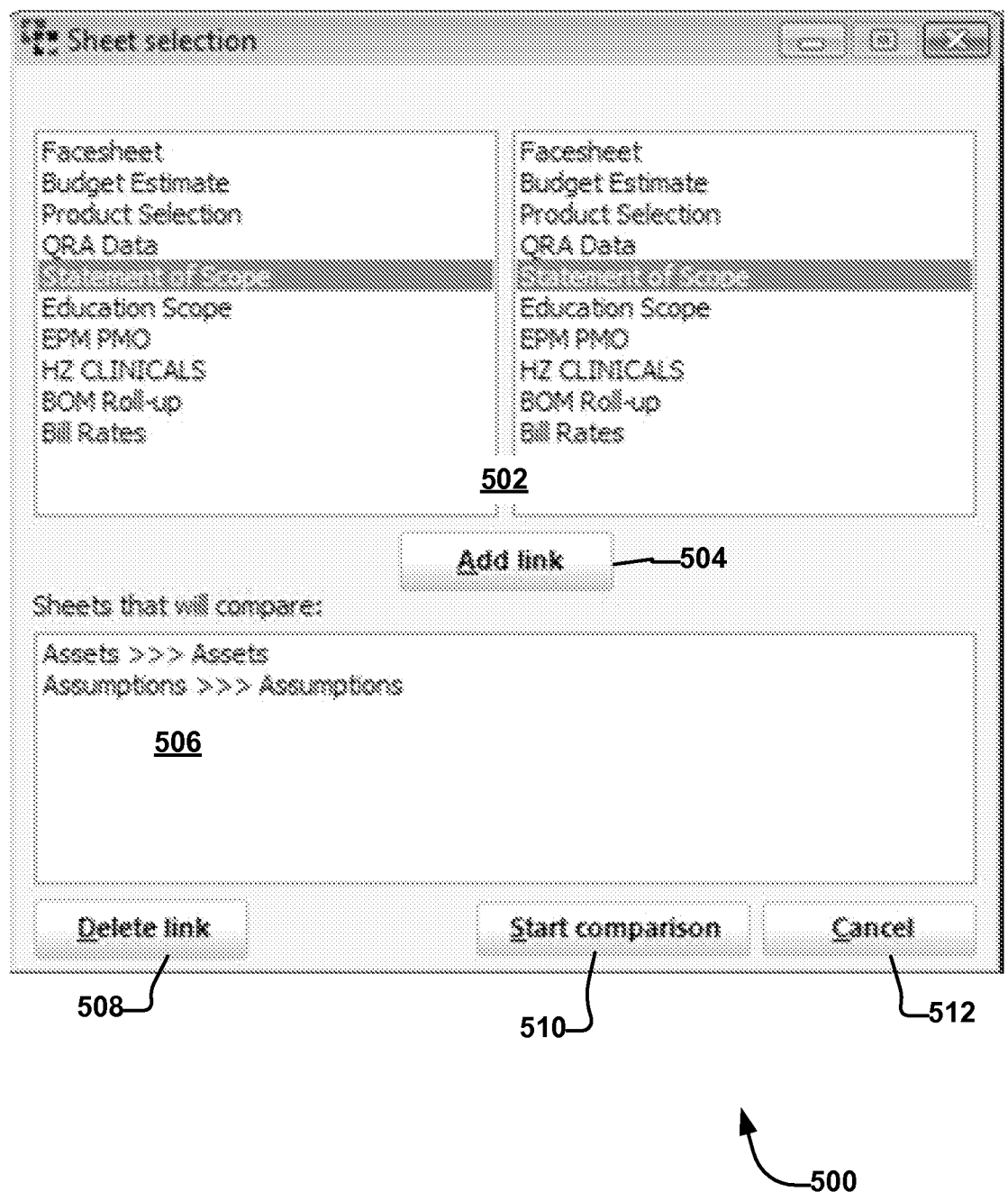
FIG. 5 shows a screenshot of an exemplary user interface for selecting particular sheets or database tables for comparison in accordance with an exemplary embodiment of the invention.

FIG. 5 is a screenshot of an exemplary graphical user interface 500 for selecting particular sheets or database tables to compare cell values and underlying formulas and stored procedures. In area 502 of the user interface 500, sheets from the original spreadsheet or database may arranged to be displayed next to sheets from a modified spreadsheet or database, although the original and modified documents may be displayed or selected in some other manner. In the exemplary interface of FIG. 5, a user may select a sheet/table from the original file on the left) and a sheet/table from the listing of the modified file on the right. The user may then select 'Add Link,' 504, to add that sheet/table to a list of sheets/tables to compare. All sheets/tables can be selected from within this interface. The list of selected sheets/tables may be displayed in an area 506, from which selected links can be deleted from the comparison list by selecting the sheet/table ling pair and the "Delete link" button 508. The user can start the comparison of the selected sheets/tables by selecting the "Start comparison" button 510, or can cancel the selections by selecting the "Cancel" button 512.

Figure 6:
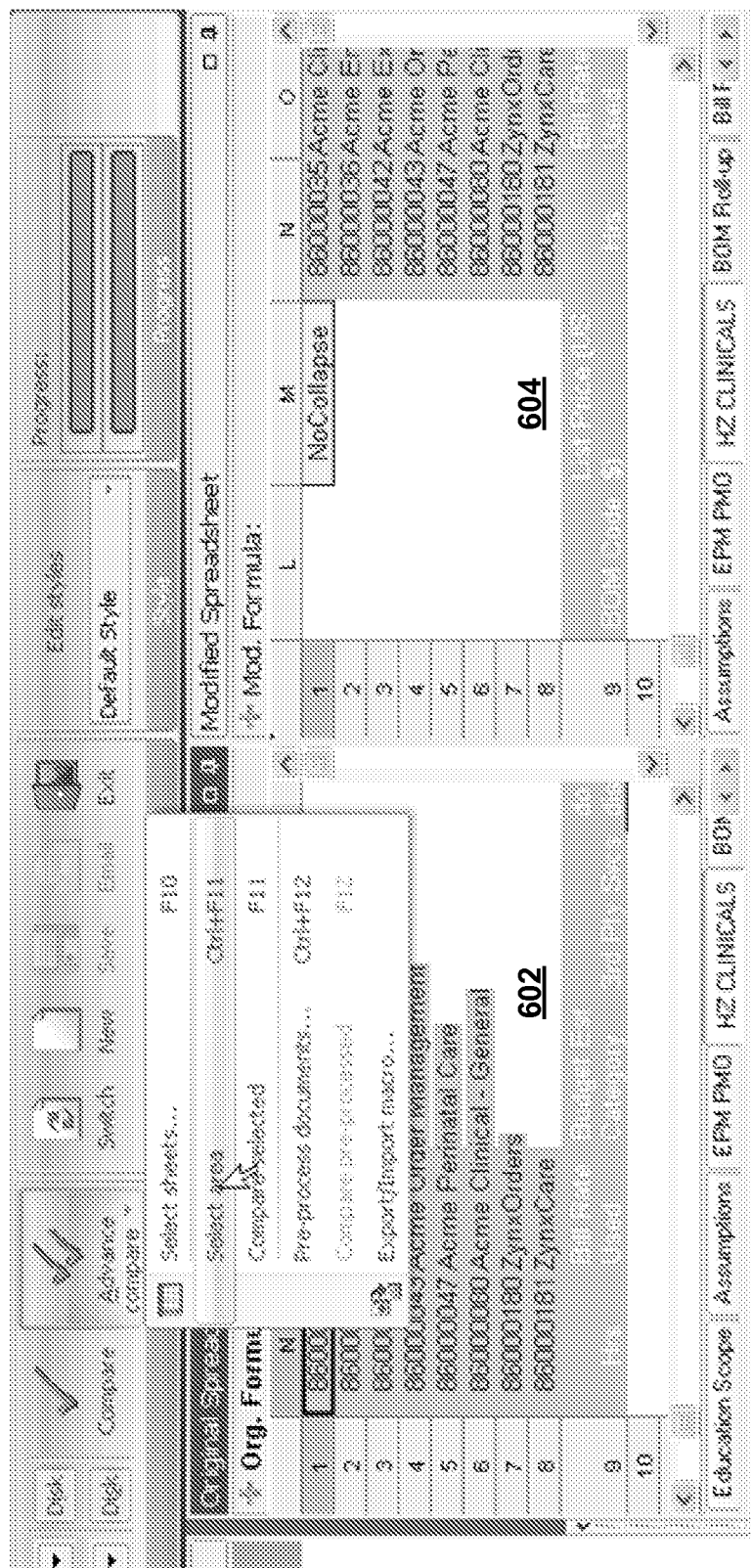
FIG. 6 shows a screenshot of an exemplary user interface for selecting particular areas within spreadsheets or database tables to compare in accordance with an exemplary embodiment of the invention.

FIG. 6 is a screenshot of an exemplary graphical user interface 600 for selecting particular areas within a spreadsheet or a database table to compare cell values and underlying formulas and stored procedures. After choosing "Select Areas to Compare" from the top menu, a user may view a screen, such as screenshot of the user interface 600, having representations of the original and modified files.

In interface section 602, the user can select particular areas from any sheet or table within the original file. In interface section 604, the user can select particular areas from any sheet or table within the modified file. After completing these selections, the user may begin a comparison operation, which compares only the areas defined in interfaces sections 602 and 604.

Figure 7A:
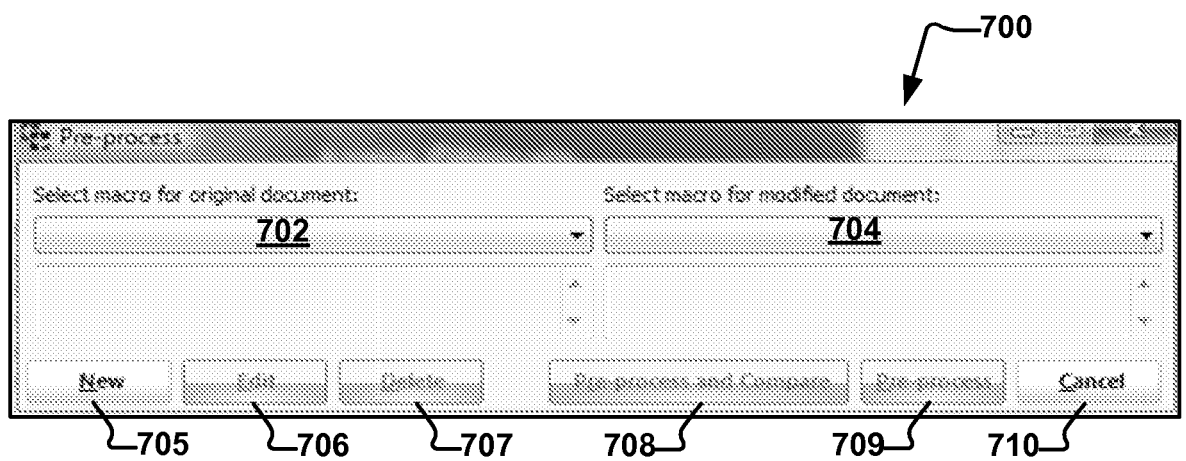
FIGS. 7A and 7B show screenshots of exemplary user interfaces for selecting macros in accordance with an exemplary embodiment of the invention.
Figure 7B:
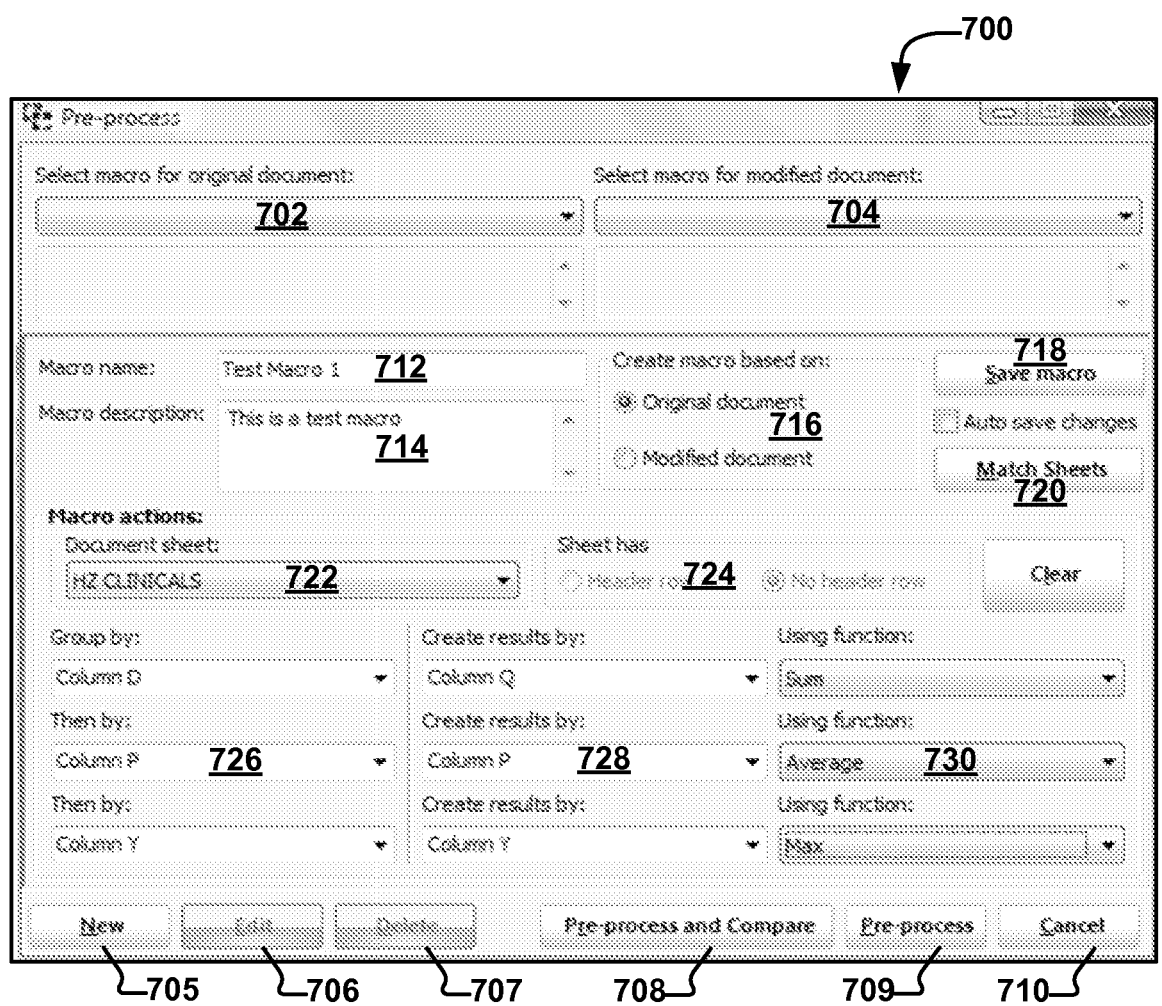

FIGS. 7A and 7B show screenshots of an exemplary graphical user interface 700 for selecting macros to utilize in pre-processing the change management of cell values, and underlying formulas and stored procedures within spreadsheets or database tables. As shown in FIG. 7A, some embodiments may include a button 702 that a user may select to display a pull down a menu listing existing macros. Thereafter, the user may choose a macro from the list of macros to apply to the original spreadsheet or database table. In some exemplary embodiments, selecting a macro may involve a user typing the name of a macro, or performing some type of macro search and/or macro selection process. Using button 704 or some other way to identify and select an existing macro, such as those described above, the user may similarly select from existing macros to apply to the modified spreadsheet or database table.

The buttons 705-707 of the graphical user interface 700 may respectively provide a user the options of creating a new macro, editing an existing macro or deleting an existing macro. A button 708 may be provided with the interface 700 to give the user the option of pre-processing and then comparing the original and modified spreadsheets or database tables using selected macros. Some embodiments may include a selectable button 709 to provide the option of pre-processing the original and modified spreadsheets or database tables without comparing them. Button 710 may be provided for cancelling pre-processing of the spreadsheets or database tables.

FIG. 7B is a screenshot of the exemplary graphical user interface 700 after selecting the "New" button 705 option that begins the process of creating a new macro that may define the process of comparing cell values and underlying formulas and stored procedures within spreadsheets or database tables. As shown in FIG. 7B, the user views a new screenshot having a series of options to create macros to apply to spreadsheets and/or database tables.

As shown in FIG. 7B, the user interface 700 may include a section 712 in which a user can define a name for the newly created macro, a section 714 in which the user can provide a description of the newly created macro, and a section 716 in which the user can select whether the macro applies to the original or modified file. The exemplary user interface 700 also may include a section 718 in which the user may save the newly created macro, a section 720 in which the user may match sheets within the original and modified files, a section 722 where the user may limit the macro to a particular sheet or table, and a section 724, where a user may define whether the sheet or table includes a header row.

FIG. 7B shows that the exemplary user interface 700 may include a section 726 that allows a user to define how the sheet or table should be grouped, such as the three levels of column grouping shown. The user interface also may include a section 728 where the user can define how the sheet or table's results should be created, such as the three levels of column creation shown. Section 730 of user interface 700 permits the user to define functions to use in the macro. For example, this exemplary embodiment enables three levels of functions. The functions used in a macro may include, for example, any of "Sum," "Count Numbers," "Average," "Maximum," "Minimum," "Product," "Standard Deviance," and "'Variance,'" or any combination of these functions. In the section including buttons 708, 709 and 710, the user is given the option to finalize the macro, pre-process and compare; finalize the macro and pre-process or cancel the pre-process operation.

FIGS. 8A and 8B are screenshots of different selected tabs of an exemplary user interface 800 for exporting or importing macros related to the processing of changes made to cell values and underlying formulas and stored procedures within spreadsheets or database tables. In section 802 of the interface, the user can select macros to export; macros selected will then be displayed in 804. In section 806, the user can choose to check all or check none of the displayed macros for exporting. In section 808, the user can apply or cancel the exporting process. In section 810, the user can browse their disk or document management system for applicable macros to import into the exemplary system and method. In section 812, macros selected in 810 are displayed, and in section 814, macros to be imported are displayed. In section 816, the user can apply or cancel the importing process.

FIGS. 9A to 9E are exemplary screenshots of user interfaces 902 to 910 for setting and defining profile styles for the presentation of changes made to original documents. For example, changes such as insertions and deletions in the text and data, formulas or stored procedures, and rows and columns may each be displayed in a user defined color and font. It will be understood that the organization, types and amounts of capabilities presented in the interfaces 902 to 910 are exemplary, and that other embodiments may include, for example, as little as one editable style, more than one editable style, no editable styles, or other editable style types not shown.

Figure 9A:
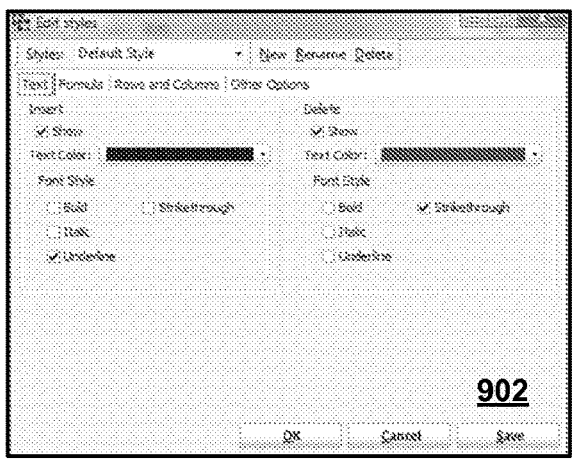
FIGS. 9A to 9E show screenshots of exemplary user interfaces for setting and defining profile styles for the presentation of changes made to original documents in accordance with an exemplary embodiment of the invention.

As shown in FIG. 9A, the screenshot of the user interface 902 presents an exemplary method for defining the colors and styles for the redline presentation of text insertions and deletions.

Figure 9B:
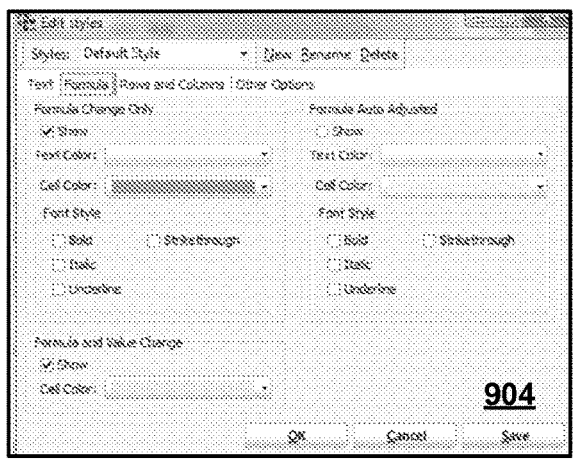

FIG. 9B shows the screenshot of user interface 904, which presents an exemplary method for defining the colors and styles for the presentation of changes made to formulas and values. This method includes defining colors and styles for text and underlying formulas and values related to formula changes and formulas and values that are auto adjusted.

Figure 9C:
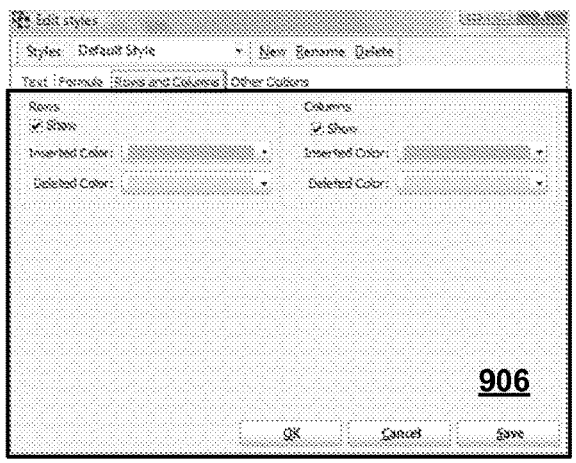

In FIG. 9C, the screenshot of the user interface 906 presents an exemplary method for defining the colors and styles for the presentation of changes made to rows and columns within spreadsheets and database tables.

Figure 9D:
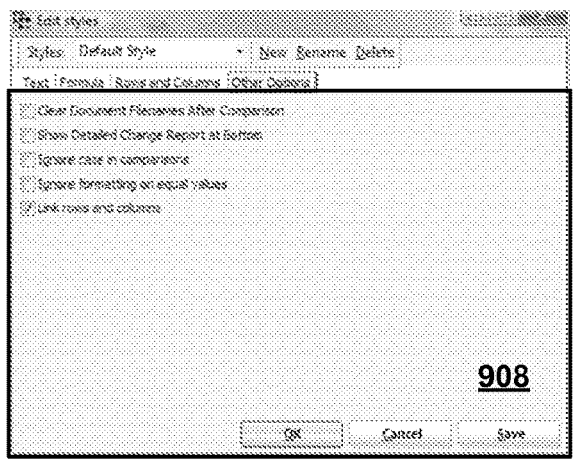

The screenshot of the user interface 908 shown in FIG. 9D presents an exemplary method for defining additional aspects of the redline presentation. The method may include the capacity to clear document filenames after comparisons, ignoring font cases in comparisons, ignoring formatting when values are equal, etc.

Figure 9E:
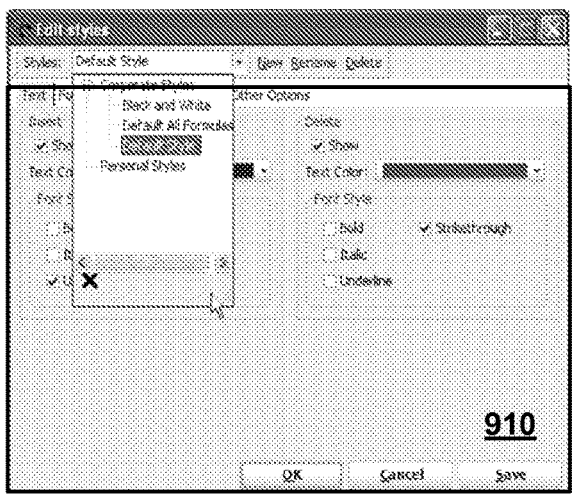

FIG. 9E shows a screenshot of the user interface 910, which presents an exemplary method for creating new, named styles and editing existing style profiles is displayed, in which the user can create parameters for the display of text, formulas, rows, columns, etc. and save that profile for future use.

Figure 10:
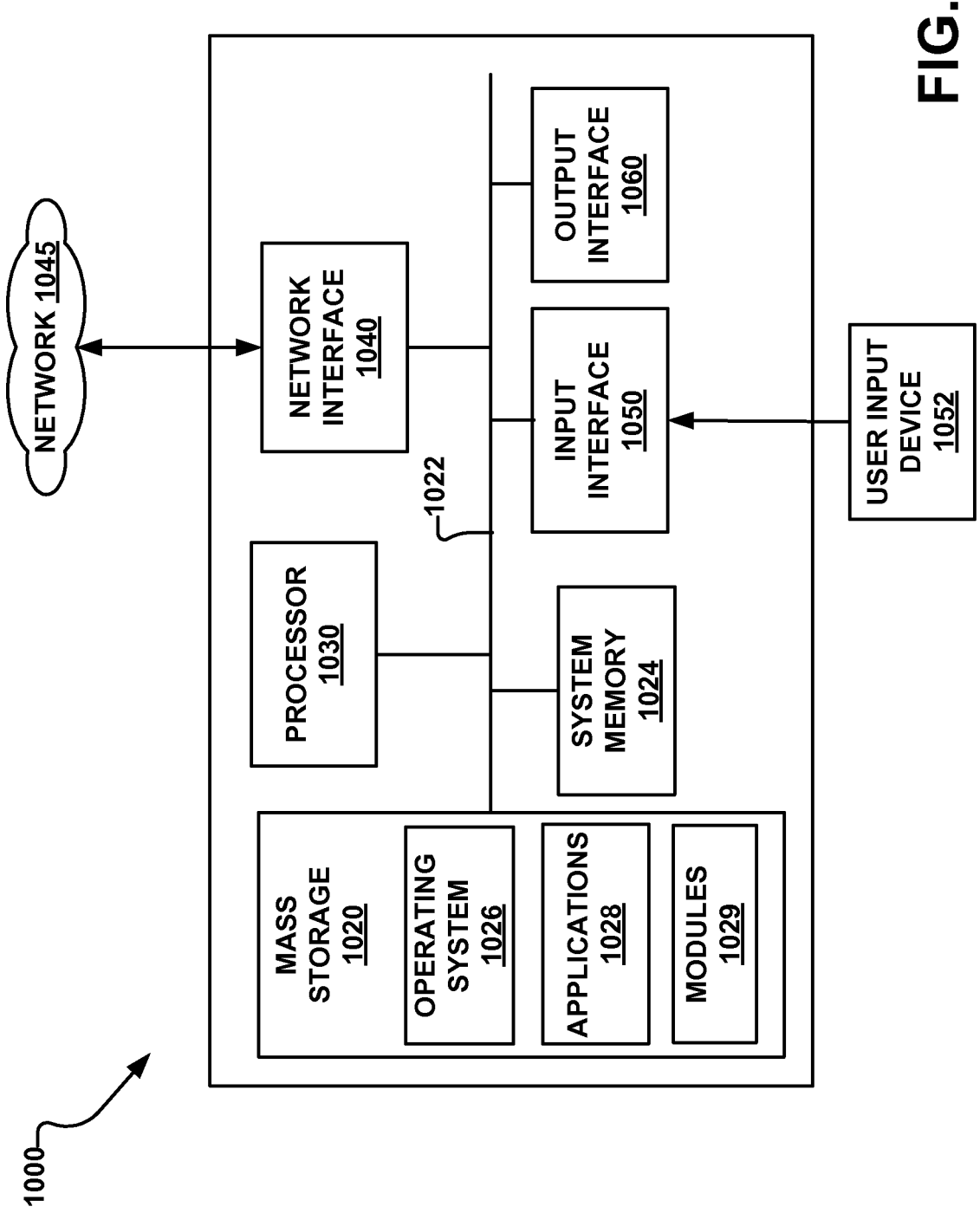
FIG. 10 is a high level block diagram of an exemplary computing operation environment in accordance with an exemplary embodiment of the invention.

It is to be understood that the devices and subsystems of the exemplary embodiments may be implemented in many variations of specific hardware and software, as will be appreciated by those skilled in the relevant art(s). With reference to FIG. 10, for example, the functionality of one or more of the devices and subsystems of the exemplary embodiments can be implemented via one or more programmed computer systems or devices, which will now be described.

The computer system components shown in FIG. 10 include mass storage 1020, system memory 1024, a processor 1030, a system bus 1022 that couples various system components to the processor 1030, a network interface 1040, an input interface 1050, and an output interface 1060, although it will be appreciated that embodiments of the invention may include more components and subcomponents than those shown in FIG. 10.

The mass storage 1020 is used for storing an operating system and application programs 1028, although other data such as program modules 1029 also may be stored in the mass storage. Mass storage 1020 is typically non-volatile (i.e., persistent) computer storage media that may include, but is not limited to, magnetic disk storage, magnetic cassettes, magnetic tape or other magnetic storage devices, ROM, hard disc or CD-ROM drive, digital versatile disks (DVD) or other optical disk storage, Programmable Read-Only Memory (PROM). Erasable Programmable Read-Only Memory (EPROM), Electrically Erasable Programmable Read-Only Memory (EEPROM or Flash memory) and/or any other medium which may be used to store the desired information and which may accessed by the system.

The applications 1028 may include at least one spreadsheet application, such as Microsoft Excel™ Sun™ StarOffice™ Calc, Microsoft Works™ Spreadsheet, Apple iWork™ Numbers and other spreadsheet applications, and/or database tables application, such as those used in Microsoft Access, SQL Server, IBM™ DB, Oracle™, Adobe™ ColdFusion and other database table applications. Embodiments of the invention may incorporate the functionality of comparing formulas and stored procedures as well as cell values among spreadsheets and/or database table documents, and of producing redline versions of these documents showing changes in formulas and stored procedures, and cell values among the compared documents, into one or more of the applications 1028. Alternatively, the move tracking and conflict resolution functionality may be in the form of a free standing module 1029 that is called on by one of the applications 1028.

System memory 1024 is typically volatile memory located on or near the processor (e.g., on a processor board) and may replicate all or parts of the data and/or program modules stored in non-volatile memory to enable fast memory access. Volatile memory includes, but is not limited to RAM, static RAM (SRAM), or other volatile memory technology. The storage 1020 and or memory 1024 may include data and/or program modules that are executable by the processor 1030. If a the computer system 1000 is part of a distributive processing environment, storage 1020 may include program modules located in local and/or remote computer storage media including memory storage devices.

The network interface 1040 may be a network card or adaptor to provide the computer system 1000 a way to connect and communicate over a network 1045, for example, a LAN or WLAN. Alternatively, the computer system 1000 may include a router and/or modem to connect to network 1045, for example, if the network were an IP-based WAN, through the network interface 1040 and a router, or through an internally or externally provided modem (not shown).

The input interface 1050 allows a user to interact with the computer system through a user input device 1052. In some embodiments, a user input device 1052 may include a keyboard, mouse or other pointing device, microphone, touch display screen, a camera or other activation or input devices known in the art.

The output interface 1060 provides an interface for providing output to an output device (not shown), such as a display screen, a printer, or other type of output device.

The above-described computer system includes, for example, any suitable servers, workstations, PCs, laptop computers, PDAs, Internet appliances, handheld devices, cellular telephones, wireless devices, other devices, and the like, capable of performing the processes of the exemplary embodiments. In embodiments in which the computer system 1000 is connected to a network, it may communicate with other network connected devices using any suitable protocol and can be implemented using one or more programmed computer systems or devices.

To implement such variations as well as other variations, a single computer system can be programmed to perform the special purpose functions of one or more of the devices and subsystems of the exemplary embodiments. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, to increase the robustness and performance of the devices and subsystems of the exemplary embodiments.

The devices and subsystems of the exemplary embodiments can store information relating to various processes described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments may store the information used to implement the exemplary embodiments of the present inventions. The databases may be organized using data structures (e.g., records, tables, arrays, fields, graphs, trees, lists, and the like) included in one or more memories or storage devices, such as those listed herein. The processes described with respect to the exemplary embodiments may include appropriate data structures for storing data collected and/or generated by the processes of the devices and subsystems of the exemplary embodiments in one or more databases thereof.

All or a portion of the devices and subsystems of the exemplary embodiments may be conveniently implemented using one or more general purpose computer systems, microprocessors, digital signal processors, micro-controllers, and the like, programmed according to the teachings of the invention, as will be appreciated by those skilled in the computer and software arts. Appropriate software can be readily prepared by programmers of ordinary skill based on the teachings of the invention, as will be appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, embodiments of the invention are not limited to any specific combination of hardware circuitry and/or software.

Stored on any one or on a combination of computer readable media, exemplary embodiments of the invention may include software for controlling the devices and subsystems of the exemplary embodiments, for driving the devices and subsystems of the exemplary embodiments, for enabling the devices and subsystems of the exemplary embodiments to interact with a human user, and the like. Such software may include, but is not limited to, device drivers, firmware, operating systems, development tools, applications software, and the like. Such computer readable media may include the computer program product of an embodiment of the invention for performing all or a portion (if processing is distributed) of the processing performed in implementing the invention. Computer code devices of exemplary embodiments of the invention may include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the invention may be distributed for better performance, reliability, cost, and the like.

As stated above, the devices and subsystems of exemplary embodiments may include computer readable medium or memories for holding instructions programmed according to the teachings of the invention and for holding data structures, tables, records, and/or other data described herein.

Computer readable medium may include any suitable medium that participates in providing instructions to a processor for execution. Such a medium can take many forms, for example, non-volatile media, volatile media, transmission media, and the like. Non-volatile media can include, for example, optical or magnetic disks, magneto-optical disks, and the like. Volatile media can include dynamic memories, such as random access memory (RAM) and the like. Transmission media may include, for example, coaxial cables, copper wire, fiber optics, air and the like. Transmission media also may take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, Programmable Read-Only Memory PROM, Erasable Programmable Read-Only Memory (EPROM), Electrically Erasable Programmable Read-Only Memory (EEPROM or Hash memory) EEPROM (e.g., a FLASH-EPROM), any other suitable memory chip or cartridge, or any other suitable medium from which a computer can read.

Currently existing document change management applications compare changes made to cell values of individual spreadsheet or database table data, (i.e., those data either typed directly into cells or created by hidden formulas) to provide a cursory location as a means to understanding a spreadsheet or database table's change history. However, these documents may be accessed by multiple users that create series of revisions and multiple documents, and complex data relationships may exist within individual spreadsheets or database tables or across linked spreadsheets or database tables. Embodiments of the invention identify changes in all aspects between spreadsheets or database table documents, including changes in "hidden" formulas and stored procedures. This capability of quickly and easily identifying all types of changes allows for enhancements of efficiencies in data management as technology, complexity of data management, and collaborative capacity increases.

While the present inventions have been described in connection with a number of exemplary embodiments, and implementations, the present inventions are not so limited, but rather cover various modifications, and equivalent arrangements, which fall within the purview of the appended claims.

What is claimed is:

1. A computer-implemented method of comparing areas of cells within a spreadsheet, the method comprising:
   receiving, by a processor, information identifying a first specified area of cells within a spreadsheet;
   receiving, by the processor, information identifying a second specified area of cells within the spreadsheet;
   applying a user-specified macro to pre-process the first specified area of cells and the second specified area of cells before comparing cell values and cell formulas;
   comparing a value of a first cell of the first specified area of cells with a value of a second cell of the second specified area of cells, wherein the second cell corresponds with the first cell;
   comparing a first formula of the first cell with a second formula of the second cell, wherein the value of the first cell is determined according to the first formula;
   identifying all textual differences between the first formula of the first cell and the second formula of the second cell;
   generating, by the processor, a comparison file corresponding to the first specified area of cells and the second specified area of cells that includes one or more cells that:
   display redline differences between the value of the first cell and the value of the second cell, and display, in redline, all textual differences between the first formula of the first cell and the second formula of the second cell.

2. The method of claim 1, further comprising: receiving user defined formatting parameters used in comparing the value of the first cell with the value of the second cell and the first formula with the second formula.

3. The method of claim 1, further comprising: receiving user defined parameters for formatting the indication of differences in the comparison file.

4. The method of claim 3, wherein said defined parameters determine the appearance of the indicated differences when the comparison file is displayed.

5. The method of claim 1, further comprising: displaying the first specified area of cells and the second specified area of cells with the one or more cells that display redline differences between the value of the first cell and the value of the second cell and display redline differences between the first formula and the second formula.

6. The method of claim 1, wherein the first specified area of cells is specified by a user.

7. A non-transitory computer-readable medium storing instructions for comparing areas of cells within a spreadsheet, the instructions, when executed, cause one or more computer processors to perform operations comprising:
   receiving information identifying a first specified area of cells within a spreadsheet;
   receiving information identifying a second specified area of cells within the spreadsheet;
   applying a user-specified macro to pre-process the first specified area of cells and the second specified area of cells before comparing cell values and cell formulas;
   comparing a value of a first cell of the first specified area of cells with a value of a second cell of the second specified area of cells, wherein the second cell corresponds with the first cell;
   comparing a first formula of the first cell with a second formula of the second cell, wherein the value of the first cell is determined according to the first formula;
   identifying all textual differences between the first formula of the first cell and the second formula of the second cell;
   generating a comparison file corresponding to the first specified area of cells and the second specified area of cells that includes one or more cells that:
   display redline differences between the value of the first cell and the value of the second cell, and display, in redline, all textual differences between the first formula of the first cell and the second formula of the second cell.

8. The non-transitory computer-readable medium of claim 7, further including instructions that, when executed, cause the processor to perform operations comprising: displaying the first specified area of cells and the second specified area of cells with the one or more cells that display redline differences between the value of the first cell and the value of the second cell and display redline differences between the first formula and the second formula.

9. A computer implemented system for comparing areas of cells within a spreadsheet, the system comprising:
- a computer having a processor that executes computer executable instructions from a memory to:
- receive a user-selected first specified area of cells within a spreadsheet;
- receive a user-selected second specified area of cells within the spreadsheet;
- apply a user-specified macro to pre-process the first specified area of cells and the second specified area of cells before comparing cell values and cell formulas;
- compare a value of a first cell of the first specified area of cells with a value of a second cell of the second specified area of cells, wherein the second cell corresponds with the first cell,
- compare a first formula of the first cell with a second formula of the second cell, wherein the value of the first cell is determined according to the first formula,
- identify all textual differences between the first formula of the first cell and the second formula of the second cell,
- generate a comparison file corresponding to the first specified area of cells and the second specified area of cells that includes one or more cells that:
- display redline differences between the value of the first cell and the value of the second cell, and display, in redline, all textual differences between the first formula of the first cell and the second formula of the second cell.

10. The system of claim 9, wherein the processor further executes computer executable instructions to: display the first specified area of cells and the second specified area of cells with the one or more cells that display redline differences between the value of the first cell and the value of the second cell and display redline differences between the first formula and the second formula.

* * * * *